July 20, 1965     E. E. GROFF     3,195,531
OUTDOOR COOKING APPLIANCES
Filed Aug. 5, 1963
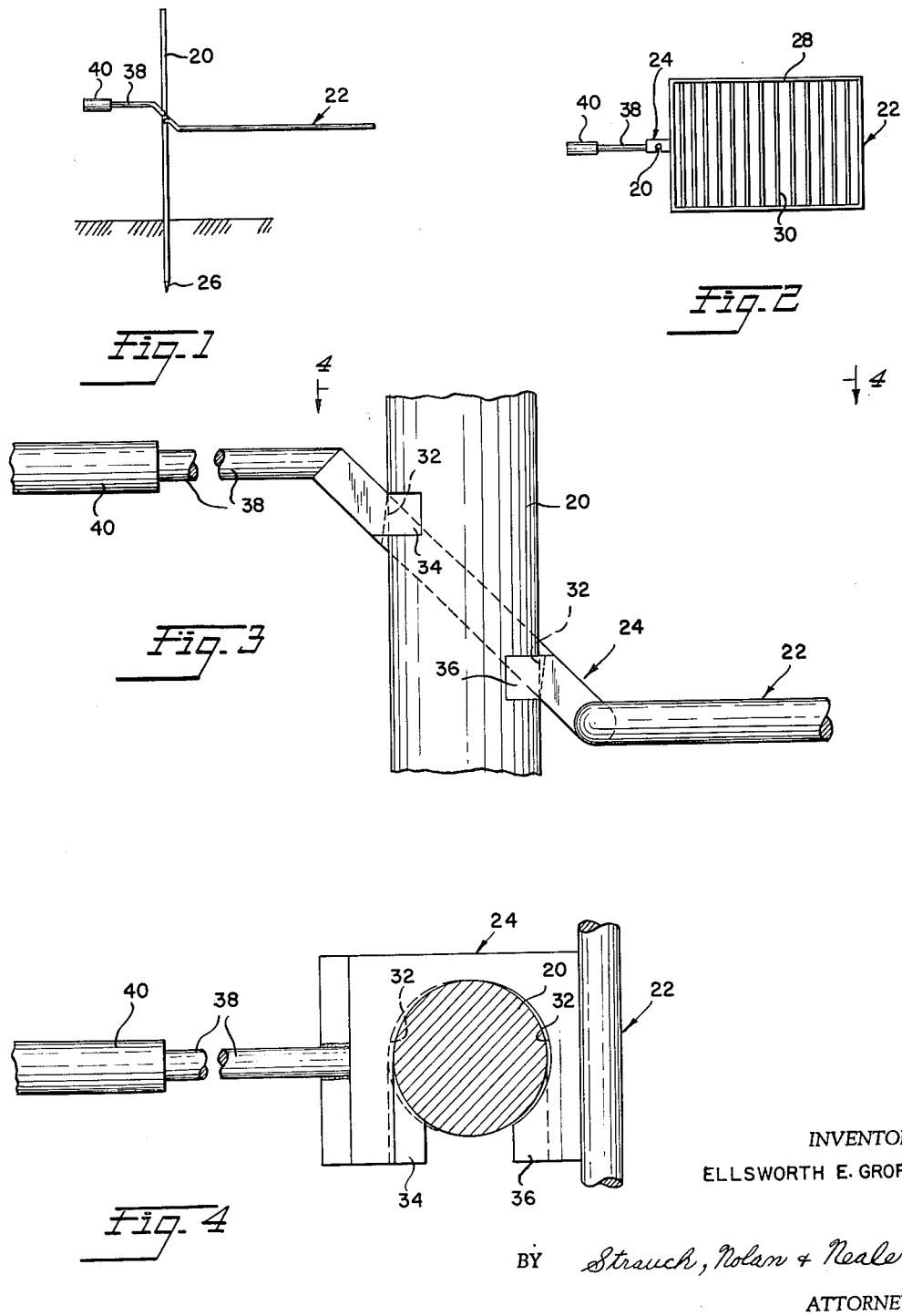
INVENTOR
ELLSWORTH E. GROFF
BY Strauch, Nolan & Neale
ATTORNEYS 3,195,531
OUTDOOR COOKING APPLIANCES
Ellsworth E. Groff, 438 Asarco Drive, Hayden, Ariz.
Filed Aug. 5, 1963, Ser. No. 299,776
1 Claim. (Cl. 126—30)

This invention relates to cooking appliances and more particularly to such appliances which are especially useful for cooking out of doors.

In recent years the increasing popularity of outdoor cooking has led to the development of a number of portable grills which range widely in complexity and cost. Most such grills are intended to be set up permanently and are too bulky to be truly portable and are usually difficult to disassemble and reassemble.

Grills of simple construction generally lack many of the features of the more expensive grills and their appeal is necessarily based on low price, true portability and ease of assembly and disassembly.

It is a principal purpose and object of the present invention to provide grilling appliances particularly suited for outdoor use which is portable, which can be quickly and easily set up for use, which are readily adjustable and which are stable in all adjusted positions, and which may be manufactured and sold at a cost well below the cost of presently available appliances.

It is a more specific object of the present invention to provide improved outdoor grills comprising a stake adapted to be driven into the ground and a grill detachably and adjustably supportable on the stake, the connection between the grill and the stake being of unique construction to facilitate setting the grill up and taking it down and adjusting the vertical or rotated position of the grill on the stake.

Additional objects and advantages of the present invention will become apparent as the description proceeds in connection with the accompanying drawings in which:

FIGURE 1 is a side elevation of the portable grill of the present invention set up for use;

FIGURE 2 is a top plan view of the grill;

FIGURE 3 is an enlarged fragmentary side elevation showing details of the connection between the grill and the stake; and FIGURE 4 is an elevation looking in the direction of the arrows 4—4 of FIGURE 3.

Referring now more particularly to the drawings, the portable grill of the present invention, which is of relatively simple construction comprises the stake 20 adapted to be driven into the ground, a grill assembly 22 for supporting the food to be cooked and a connector unit 24 for detachably and adjustably supporting the grill 22 on the stake.

The stake, which is preferably a rigid metallic rod, is cylindrical from end to end except for a point 26 provided at its lower end to facilitate driving the stake into the ground. Essentially the entire body of the stake thus provides a cylindrical mounting portion for the grill. The opposite upper end of the stake is flat to provide a convenient impact surface.

The grill assembly 22 may take a number of different conventional forms. In the illustrated embodiment it comprises a rectangular frame 28 preferably formed of relatively heavy wire and a series of light cross wires 30 welded or otherwise suitably secured at their opposite ends to the side portions of the frame 28.

The grill assembly 22 is mounted on the stake by the connector 24, preferably formed from a single piece of heavy gauge sheet metal. Preferably when the grill is of an elongated rectangular form as shown, the connector is attached to one end of the grill. The connector is provided with a central elongated opening 32 of slightly greater width than the diameter of the stake 20 and of substantially greater length than the diameter of the stake. The ends of the opening 32 are formed on essentially the same radius as the stake. The axis of the opening 32 is inclined at an angle of about 45° with respect to the plane of the body of the connector 24.

As best shown in FIGURES 3 and 4 the connector is cut away at one side of the opening 32 and the resulting tabs 34 and 36 are bent in opposite directions out of the plane of the body of the connector.

The connector is welded or otherwise rigidly secured to the main frame of the grill to dispose the body of the connector at an angle of approximately 45° with respect to the plane of the grill. At its opposite end the connector is provided with a handle 38 which extends away from the connector in a plane parallel to and above the plane of the grill 22. If desired, the handle may be provided at its outer end with a grip 40 of wood or other insulating material.

When it is desired to set up the grill, the stake 20 is driven into the ground closely adjacent the fire over which the food is to be cooked. The grill is then assembled to the stake either by slipping the connector onto the stake over its upper end or by moving the connector laterally onto the stake. In this connection it is to be noted that because of the inclination of the body of the connector and the oval shape of the opening 32 the longitudinal axis of this opening is considerably greater than the diameter of the stake. Accordingly, when the body of the connector is moved to a horizontal position the spacing between the ends of the relatively short tabs 34 and 36 also exceeds the diameter of the rod 20 thus permitting the connector to be slipped laterally onto the rod 20. This is a feature of particular convenience since after the stake has been used several times its upper end may tend to become peened over or enlarged which could cause difficulty in assembly and disassembly of the components in the absence of the side opening provided between the tabs 34 and 36.

After the connector is placed on the stake 20, it is released and the weight of the grill causes the body of the connector to assume its inclined position to dispose the grill 22 in a horizontal plane. This action also causes the edges of the opening 32 in the connector 24 to bite into the stake 20 to firmly hold the grill in its adjusted position. Despite the fact that the grill is firmly gripped with a frictional engagement which increases when food or utensils are placed upon the grill, nevertheless, it may be freely rotated as desired or raised or lowered by swinging the handle 38 or by tilting it slightly upward from the position shown to relieve the gripping action of the sides of the opening 32. Any adjustment can be effected solely by gripping the outer end of the handle 40 which is remote from the fire and it is not necessary to loosen or tighten or remove any parts to effect any desired adjustment of the grill. Thus, the grill affords a degree of convenience in use not possessed by comparable items heretofore available.

Further, because of the inclination of the connector it is not necessary that any of the parts be made to close tolerances or that screws or other relatively expensive parts be provided to lock the components in any adjusted position. Thus, the grill may be manufactured at a cost well below that of comparable units.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim is therefore intended to be embraced therein.

What is claimed and desired to be secured by Letters Patent is:

A portable cooking appliance comprising a vertical stake adapted to be driven into the ground, said stake having a cylindrical mounting portion, a normally horizontal grill, and means forming a connector attached at one end to said grill, said connector being essentially flat and being included at an angle upwardly with respect to the plane of said grill, said connector having an elongated through opening formed to be substantially larger than the diameter of the cylindrical mounting portion of the stake, said mounting portion extending through said opening, the end edges of said opening being urged into tight frictional engagement with said mounting portion of said stake by the weight of said grill, said connector having a side opening leading into said through opening to permit said connector to be moved onto or removed from said stake by movement laterally of said stake, a pair of tabs integral with said connector adjacent said side opening and respectively bent to extend above and below the plane of said connector, said tabs being effective to prevent removal of said connector from said stake except when the plane of said connector is substantially normal to the axis of said stake, and a handle fixed to the opposite end of said connector and extending away from said grill in a plane substantially parallel to the plane of said grill.

References Cited by the Examiner
UNITED STATES PATENTS

| | | | |
|---|---|---|---|
| 620,175 | 2/99 | Pinault | 126—30 X |
| 1,086,813 | 2/14 | Fritts | 248—296 X |
| 1,631,209 | 6/27 | Jewell | 248—296 |
| 2,216,886 | 10/40 | Langelier | 248—296 X |
| 2,765,999 | 10/56 | Baker | 126—30 X |
| 2,827,846 | 3/58 | Karkling | 126—30 X |
| 2,960,979 | 11/60 | Stone | 126—30 X |

JAMES W. WESTHAVER, *Primary Examiner.*

UNITED STATES PATENT OFFICE
CERTIFICATE OF CORRECTION

Patent No. 3,195,531  
July 20, 19

Ellsworth E. Groff

It is hereby certified that error appears in the above numbered patent requiring correction and that the said Letters Patent should read as corrected below.

Column 3, line 10, for "included" read -- inclined --.

Signed and sealed this 11th day of January 1966.

(SEAL)  
Attest:

ERNEST W. SWIDER  
Attesting Officer

EDWARD J. BRENNER  
Commissioner of Patents